US012802460B2

(12) United States Patent
Anderson et al.

(10) Patent No.: US 12,802,460 B2
(45) Date of Patent: Nov. 17, 2026

(54) SYSTEM AND METHOD FOR MISSION OVERWATCH VIA CREWED AND UNCREWED VEHICLES

(71) Applicant: Rockwell Collins, Inc., Cedar Rapids, IA (US)

(72) Inventors: Ross D. Anderson, Lakeville, MN (US); Kevin M Kronfeld, Cedar Rapids, IA (US); Subhashish Chakravarty, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 241 days.

(21) Appl. No.: 18/747,806

(22) Filed: Jun. 19, 2024

(65) Prior Publication Data

US 2025/0391175 A1 Dec. 25, 2025

(51) Int. Cl.

| | |
|---|---|
| ***G06V 20/58*** | (2022.01) |
| ***G06T 7/70*** | (2017.01) |
| ***G06V 20/17*** | (2022.01) |

(52) U.S. Cl.

CPC ................ *G06V 20/58* (2022.01); *G06T 7/70* (2017.01); *G06V 20/17* (2022.01); (Continued)

(58) Field of Classification Search

CPC .......... G06V 20/58; G06V 20/17; G06T 7/70; G06T 2207/10032; G06T 2207/30196; G06T 2207/30212; G06T 2207/30261

See application file for complete search history.

(56) References Cited

U.S. PATENT DOCUMENTS

| | | | | |
|---|---|---|---|---|
| 10,915,118 | B2 | 2/2021 | Boland et al. | |
| 11,119,485 | B1 * | 9/2021 | Barsamian | G06Q 10/0635 |

(Continued)

FOREIGN PATENT DOCUMENTS

| | | | | |
|---|---|---|---|---|
| KR | 102316704 B1 | * 10/2021 | | G01G 19/00 |
| WO | WO-2012172160 A1 | * 12/2012 | | H04W 4/021 |
| WO | WO-2020146491 A3 | * 9/2020 | | G06T 19/00 |

OTHER PUBLICATIONS

Heidari, A. et al. "Machine Learning Applications in Internet-of-Drones Systematic Review, Recent Deployments, and Open Issues" ACM Computing Surveys, vol. 55, No. 12, Article 247, Publication Date: Mar. 2023, pp. 1-45 (Year: 2023).*

(Continued)

*Primary Examiner* — Mia M Thomas
(74) *Attorney, Agent, or Firm* — Suiter Swantz IP

(57) ABSTRACT

A system and method for providing mission overwatch and situational awareness to ground-based troops or personnel (e.g., friendlies) operating in a mission environment (and according to a mission plan) receives a current position from the friendlies and environmental data collected by (mobile or fixed) mission sensors throughout the mission environment. Detected objects (friendly or hostile) are associated with a position relative to local landmarks having known locations. Environmental data is analyzed to determine other attributes of the detected objects: type, affiliation (friend/foe), motion (direction/speed), intent, and/or threat level. Concise descriptive reports are generated informing the friendlies of the activities of any objects of particular interest, with reports selected and forwarded to the friendlies on the basis of brevity, clarity, and/or relevance (e.g., compatibility with the friendlies' current field of view).

20 Claims, 10 Drawing Sheets

(52) U.S. Cl.
CPC ............... *G06T 2207/10032* (2013.01); *G06T 2207/30196* (2013.01); *G06T 2207/30212* (2013.01); *G06T 2207/30261* (2013.01)

(56) References Cited

U.S. PATENT DOCUMENTS

| | | | | |
|---|---|---|---|---|
| 11,210,957 | B2 * | 12/2021 | Hoh | G08G 5/22 |
| 11,922,620 | B2 * | 3/2024 | Hernandez | G06T 5/80 |
| 11,960,283 | B1 * | 4/2024 | Manouchehri | H04L 9/50 |
| 12,207,582 | B1 * | 1/2025 | Castilla-Rubio | G05D 1/229 |
| 2017/0032586 | A1 * | 2/2017 | Cheatham, III | G06Q 10/0833 |
| 2020/0043229 | A1 * | 2/2020 | Jin | G06F 21/30 |
| 2020/0365040 | A1 * | 11/2020 | Hoh | G08G 5/727 |
| 2021/0221506 | A1 * | 7/2021 | Phelan | G01S 13/951 |
| 2021/0350162 | A1 * | 11/2021 | Miller | G05D 1/0094 |
| 2022/0019759 | A1 * | 1/2022 | Goyal | B64D 47/04 |
| 2022/0075956 | A1 | 3/2022 | Mont-Reynaud et al. | |
| 2022/0137625 | A1 | 5/2022 | Herz et al. | |
| 2022/0194576 | A1 | 6/2022 | Yang et al. | |
| 2022/0309934 | A1 * | 9/2022 | Panchangam | G08G 5/53 |
| 2022/0386072 | A1 | 12/2022 | Nurminen et al. | |
| 2022/0396376 | A1 * | 12/2022 | Anderson | G06Q 10/063118 |
| 2023/0206646 | A1 * | 6/2023 | Ren | G06F 18/22 382/104 |
| 2023/0222809 | A1 * | 7/2023 | Al-Sinan | B64D 47/08 382/103 |
| 2024/0248477 | A1 * | 7/2024 | Weinheber | G05D 1/86 |
| 2024/0386580 | A1 * | 11/2024 | Orosz | G06V 20/54 |
| 2024/0411314 | A1 * | 12/2024 | Manouchehri | G05D 1/226 |
| 2024/0412648 | A1 * | 12/2024 | Manouchehri | B64U 10/00 |
| 2025/0191358 | A1 * | 6/2025 | Malaviarachchi | H04B 7/18523 |
| 2025/0264879 | A1 * | 8/2025 | Manouchehri | G06V 20/17 |
| 2025/0285544 | A1 * | 9/2025 | Manouchehri | H04L 63/083 |
| 2026/0057783 | A1 * | 2/2026 | Bellafaire | B60R 19/483 |

OTHER PUBLICATIONS

Azmi, I.N. et al. "Flying Ad Hoc Coverage Area Mobility Model for Post-Disaster Area based on Two Drones", 2023 International Conference on Computing, Networking and Communications (ICNC): Dec. 14, 2024 (5 pages) (Year: 2024).*

Kurunathan, H. et al. "Machine Learning-Aided Operations and Communications of Unmanned Aerial Vehicles: A Contemporary" Submitted IEEE Communications Surveys and Tutorials: May 2023, pp. 1-41. (Year: 2023).*

Peksa, J. et al. "A Review on the State of the Art in Copter Drones and Flight Control Systems", Sensors 2024, vol. 24, No. 3349, pp. 1-42 (Year: 2024).*

* cited by examiner

SYSTEM AND METHOD FOR MISSION OVERWATCH VIA CREWED AND UNCREWED VEHICLES

BACKGROUND

Ground-based troops may require real time or near real time situational awareness in order to safely proceed through a mission environment while fulfilling their assigned mission objectives, especially if the mission environment is an unfamiliar one (e.g., unfamiliar terrain, suburban, or urban environment) where hostiles and/or adversaries may also be in operation. However, even if troops have knowledge of their own position (e.g., with respect to satellite-based or other absolute positioning systems) nor be able to depend on map displays to gain this situational awareness. For example, troops may not be equipped with suitable displays, or the need to reference a map or refer to a display may be an unreasonable distraction from other tasks at hand.

The problem of situational awareness may be addressable via mobile sensors, e.g., mounted on swarms of uncrewed aerial vehicles distributed throughout the mission environment. However, even if said mobile sensors know the absolute position of friendly troops as well as potential and actual hostiles, providing absolute positioning coordinates of hostiles or unknowns to the ground troops may be cumbersome (e.g., coordinates being represented by lengthy character sequences) and dilutive of cognitive focus (e.g., coordinates provide no intuitive information as to the motion, orientation, or intent of hostiles/unknowns).

SUMMARY

In a first aspect, a system for overwatch of friendly ground-based troops or personnel (e.g., "friendlies") is disclosed. In embodiments, the system includes a memory for storing a mission plan including goals or objectives to be fulfilled by the friendlies within a defined mission environment. Further, the mission plan includes locations tied to landmarks (e.g., natural or fabricated structures, features, or fixtures) within the environment. Fixed and/or mobile mission sensors deployed within the mission environment detect objects of interest (which may include vehicles, structures, personnel, and the friendlies themselves). The overwatch system receives current position information from the friendlies and environmental data from the mission sensors, identifying or detecting any objects of interest from the environmental data. Any detected objects of interest are provided with positions or locations determined by the overwatch system relative to a known landmark. The overwatch system assesses any attributes and/or characteristics of any detected objects of interest (other than the friendlies), such as: type or classification (e.g., person, group, vehicle, natural phenomenon); object status (friendly, hostile, neutral, unknown); motion vector (e.g., direction and speed, if the object is mobile); intent of the object, if known. The overwatch system generates descriptive reports based on new information acquired with respect to objects of interest (e.g., including the positions and attributes of any such relevant objects, such as hostile or potentially hostile objects moving toward or threatening the friendlies). Descriptive reports are forwarded to the friendlies.

In some embodiments, the overwatch system generates several descriptive reports and selects a final report for forwarding, e.g., on the basis of clarity, brevity, and/or relevance to the friendlies' current position.

In some embodiments, descriptive reports are textual reports (e.g., generated via natural language processing) or graphical reports (e.g., designed to instantly convey relevant information without distraction or loss of cognitive focus).

In some embodiments, position data received from the friendlies includes a current orientation and/or field of view (FOV) of the friendlies.

In some embodiments, the final descriptive report is selected for forwarding from a pool of candidate reports on the basis of compatibility of the report with the friendlies' current FOV.

In some embodiments, mission sensors are mounted to an uncrewed vehicle, e.g., a partially (remotely operated) or fully autonomous vehicle.

In some embodiments, based on the current position data and attributes determined with respect to an object of interest, the overwatch system generates instructions or commands for execution by the uncrewed vehicle.

In some embodiments, mission sensors are attached or mounted to a crewed vehicle.

In some embodiments, mission sensors are attached or mounted to an aerial vehicle or a ground-based vehicle.

In some embodiments, the intent of an object of interest includes a threat assessment or threat level.

In some embodiments, the overwatch system assesses an intent of an object of interest based on a change in one or more attributes of that object (e.g., changes in position/or activity of the object over several periods or events of sensing by the mission sensors).

In a further aspect, a computer-assisted method for providing overwatch to friendlies operating in a mission environment is also disclosed. In embodiments, the method includes providing a mission plan, the mission plan including goals and/or objectives for fulfillment by the friendlies The method includes receiving current position data from the friendlies. The method includes sensing environmental data within the mission environment via fixed or mobile mission sensors operating within the environment. The method includes determining positions of one or more objects of interest detected by the environmental data, the positions relative to the location of landmarks within the environment whose locations are known to (or incorporated into) the mission plan. The method includes assessing attributes of the detected objects of interest based on the determined positions and/or the mission plan, e.g.: type or classification (person, group, vehicle, structure, weather system or other natural phenomenon); status of the object (friendly, neutral, hostile); vector, if the object is mobile (direction, speed); and/or intent of the object. The method includes generating a descriptive report based on new information acquired (e.g., new positions, new attributes, change in status) with respect to one or more objects of interest. The method includes forwarding the descriptive report to the friendlies.

In some embodiments, the method includes selecting a final descriptive report for forwarding from a pool of candidate reports.

In some embodiments, the method includes generating a textual report (e.g., via natural language processing) or a graphical report (e.g., for instant conveyance of relevant information without distraction or loss of cognitive focus).

In some embodiments, the method includes receiving with the current position data an orientation or field of view (FOV) of the friendlies.

In some embodiments, the method includes selecting a final descriptive report for forwarding based on a compatibility of the report/s with the current FOV of the friendlies.

In some embodiments, the method includes sensing environmental data via mission sensors mounted or attached to an uncrewed vehicle.

In some embodiments, the method includes generating instructions or commands for the uncrewed vehicle based on the position data and/or determined attributes of the object/s of interest, and forwarding the instructions or commands to the uncrewed vehicle for execution.

In some embodiments, the method includes determining a threat level of one or more detected objects of interest.

In some embodiments, the method includes determining an intent of an object of interest based on a change in position or attributes of the object, e.g., over time or over several sensing events or periods.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
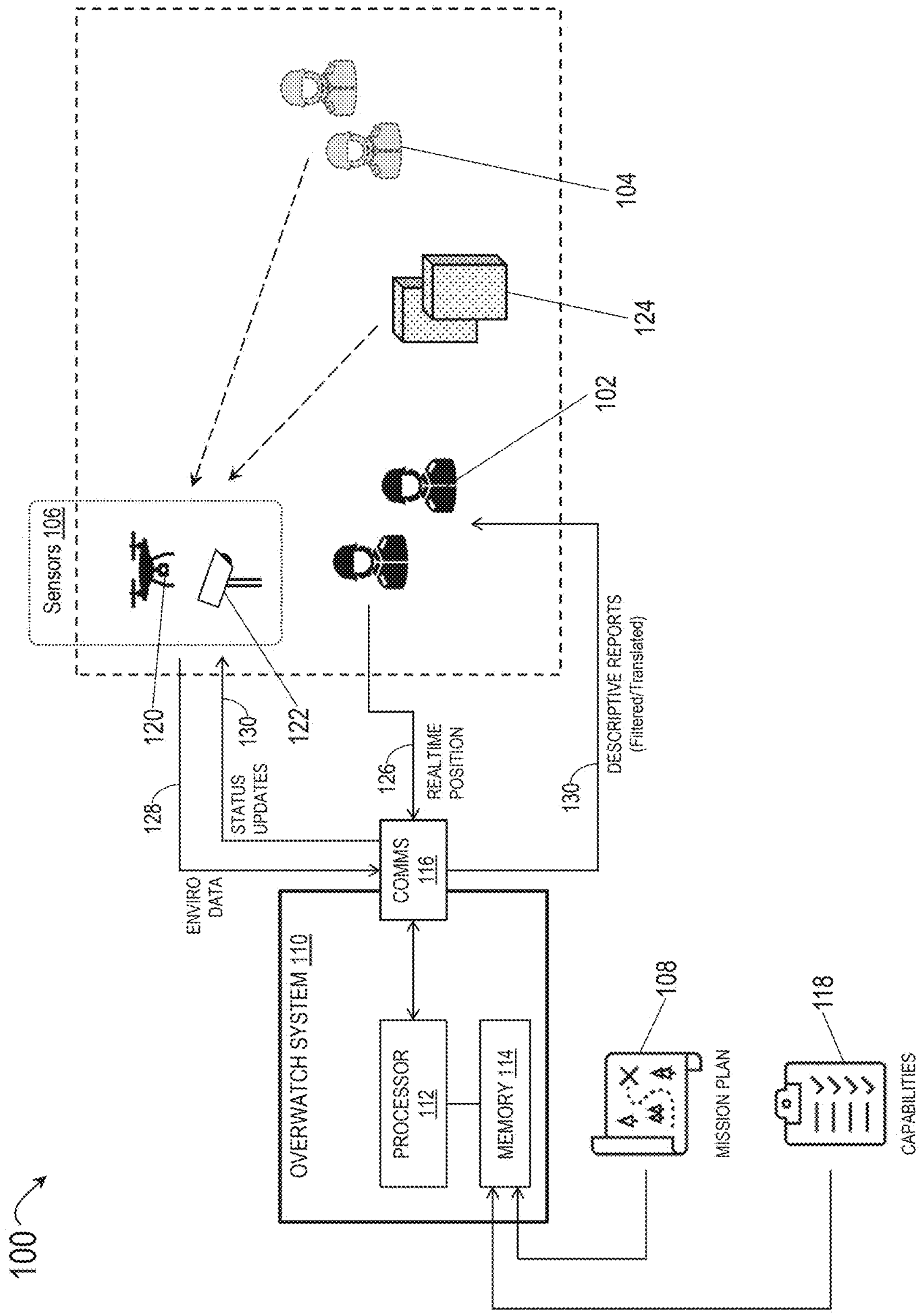
FIG. 1 is a block diagram illustrating system for mission overwatch of friendly troops within a mission environment according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring now to FIG. 1, a mission environment 100 is shown. The mission environment 100 may include one or more friendlies 102 (e.g., friendly ground troops), one or more unknowns 104 (e.g., unknown personnel, equipment, or objects), and one or more mission sensors 106.

In embodiments, the friendlies 102 may be tasked with fulfilling one or more specific mission goals or objectives as specified by a mission plan 108. For example, the friendlies 102 may not be aware of the unknowns 104, or may be aware generally of the presence of potential or actual hostile objects or personnel (e.g., or unknown objects or personnel) within the mission environment 100. However, even if the friendlies 102 are aware that unknowns 104 may be in operation somewhere within the mission environment 100 (e.g., or near it), they may not be aware of the location of the unknowns at any given moment, nor of any movement of the unknowns, nor even of the intent of the unknowns (e.g., friend/foe, hostile, ally, adversary, threat, no threat).

In embodiments, a mission overwatch system 110 may provide intuitive situational awareness in real time or near real time to friendlies 102 in operation within the mission environment according to the mission plan 108. For example, the mission overwatch system 110 may include one or more mission processors 112, memory 114, and communications interfaces 116 (e.g., wireless, secure, encrypted) to the friendlies 102 as well as mission sensors

106 in operation throughout the mission environment 100. For example, the memory 114 may provide data storage for the mission plan 108 as well as capabilities 118 of the friendlies 102 as well as hostiles known or thought to be in operation within the mission environment 100 (which may or may not include the unknowns 104). For example, capabilities 118 may include specifications relevant to any vehicles, weapons, equipment, and/or engineering support utilized by the friendlies 102 in fulfillment of the mission plan 108. Further, capabilities 118 may inform distance and/or speed thresholds and/or other details relevant to the movement of the friendlies 102 or, e.g., whether unknowns 104 and/or hostiles pose a threat, and if so, how great a threat. In some embodiments, capabilities 118 may further include intelligence (e.g., if said intelligence is sufficiently reliable) relevant to weapons, vehicles, and/or equipment known or believed to be within the mission environment 100 or under the control of unknowns 104 and/or hostiles.

In embodiments, the mission sensors 106 may include mobile sensors 120 and/or fixed-location sensors (e.g., cameras 122). For example, mobile sensors 120 may be mounted to a vehicle (e.g., uncrewed/crewed, airborne/ground-based) in operation within the mission environment 100 and controlled by the overwatch system 110. In embodiments, the mission sensors 106 may identify and detect objects of interest within the mission environment 100. For example, the mission sensors 106 may detect within the mission environment 100 landmarks 124, e.g., natural or manmade objects or structures having a fixed location (e.g., absolute coordinates, absolute position) relative to the mission environment and known to the mission plan 108. Further, the mission sensors 106 may detect unknowns 104, e.g., personnel, vehicles, and/or objects other than the friendlies 102.

In embodiments, the friendlies 102 may report their positions (126) to the overwatch system 110 in real time or near real time. For example, one or more of the friendlies 102 (e.g., proceeding as a group through the mission environment 100) may periodically and automatically report their positions 126 via global navigation satellite system (GNSS) receivers (e.g., GPS, GLONASS, Galileo, BeiDou) carried on their person. In some embodiments, the mission environment 100 may be partially or fully GPS-challenged or GPS-denied, e.g., reliable satellite-based absolute positioning information may not be available, and one or more friendlies 102 may report relative positions (e.g., relative to a last known absolute position) via inertial measurement units while satellite positioning signals are unavailable.

In embodiments, the overwatch system 110 may receive real time position information 126 provided by the friendlies 102 as well as environmental data 128 sensed by the mission sensors 106 throughout the mission environment 100. For example, the overwatch system 110 may correlate environmental data 128 with knowledge of the mission environment 100 (e.g., according to the mission plan 108) to identify any unknowns 104 detected by the mission sensors 106 and determine additional attributes of the unknowns relevant to the friendlies 102 depending on the information available.

In embodiments, attributes of an unknown 104 may include a status, if available (e.g., friend, foe, hostile, adversary). Further, attributes may include a classification of the unknown (e.g., one person, group of persons, vehicle (ground-based, airborne, water-based), object (e.g., an obstacle capable of concealing other unknowns 104 from view), phenomenon (e.g., a weather system). Further still, attributes may include a vector of the unknown 104, if the unknown is moving (e.g., direction, speed). Further still, attributes may include an intent of the unknown, if determinable (e.g., possible objectives, possible goals, threat, no threat).

In embodiments, the overwatch system 110 may similarly correlate environmental data 128 with the real-time position information 126 in order to locate the friendlies 102 within the mission environment 100 relative both to the unknowns 104 and to any other known landmarks or features within the mission environment and known to the mission plan 108.

In embodiments, the overwatch system 110 may generate descriptive reports 130 based on relative position information of the unknowns 104 via natural language processing. For example, descriptive reports 130 may provide compact, timely, and intuitive information as to the relative location, intent, and/or mission impact of any unknowns 104 detected within the mission environment. Descriptive reports may be intuitive in that they may be generated and/or selected by the overwatch system 110 to be optimally informative to friendlies 102 while minimizing or precluding redirection or dilution of cognitive focus. In embodiments, descriptive reports 130 may be forwarded by the overwatch system 110 to friendlies 102 operating throughout the mission environment 100 (e.g., information specific to friendlies operating at a particular location to which the report is relevant). In some embodiments, the overwatch system 110 itself may be attached or mounted to a vehicle operating within the mission environment 100, or some or all of the overwatch system components (e.g., processor/s 112, memory 114, communications interfaces 116) may be carried by a friendly 102 (e.g., by troops or other mission personnel operating on the ground within or outside the mission environment).

In embodiments, the overwatch system 110 may further provide status updates 132 to mission sensors 106 based on descriptive reports 130 generated and forwarded to friendlies 102, e.g., mobile sensors 120 aboard uncrewed vehicles. For example, a status update 132 may include executable commands and/or directions to an uncrewed vehicle, e.g., instructions to follow and/or observe a detected unknown 104 (e.g., an unknown identified as a hostile and/or threat, whose intent is of particular interest to the friendlies 102 or particularly impactful upon mission objectives).

Figure 2:
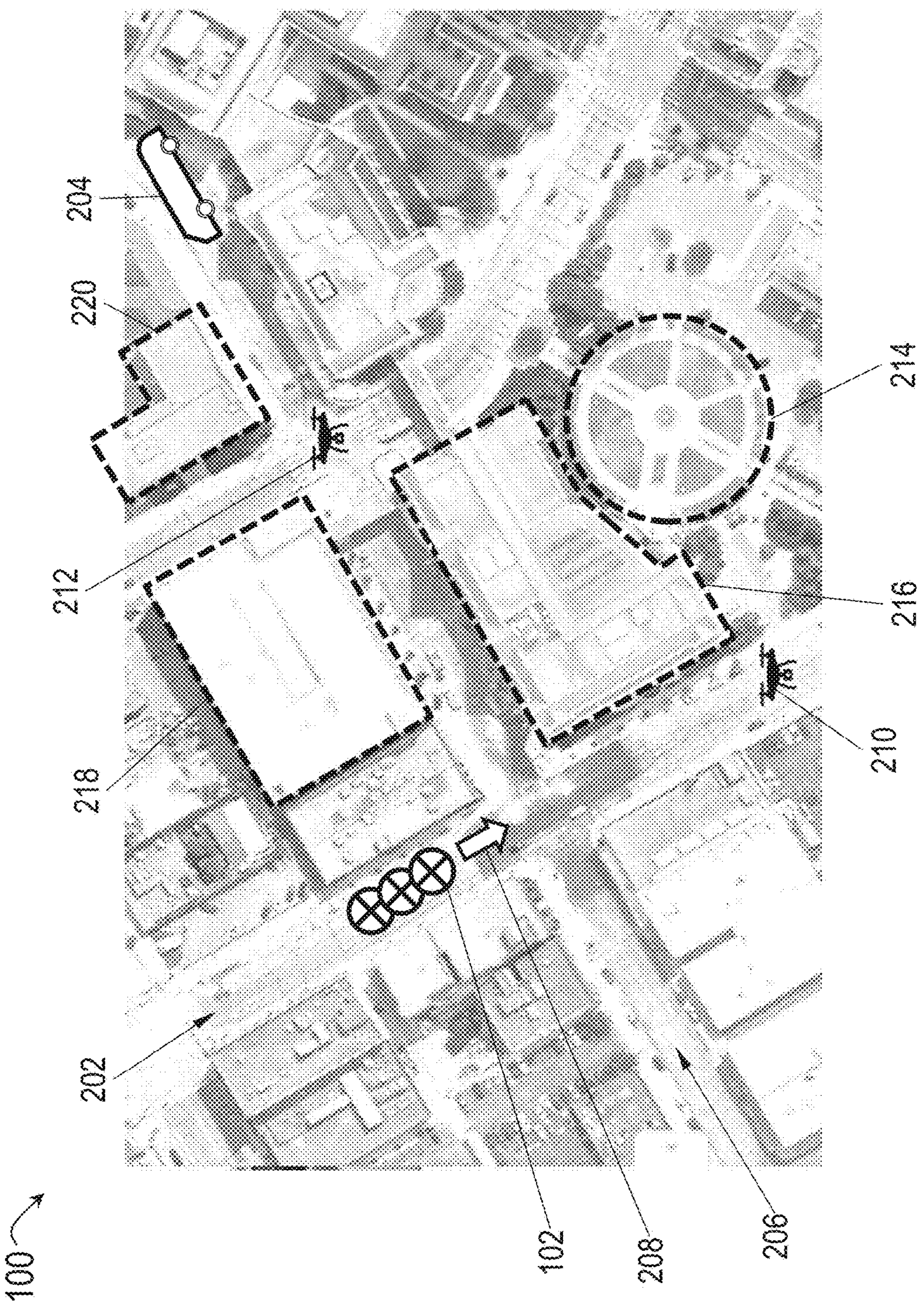
FIG. 2 is a diagrammatic overhead view of the mission environment of FIG. 1.

Referring now to FIG. 2, the mission environment 100 is shown. For example, the mission environment 100 may be an urban area.

In embodiments, the friendlies 102 may be proceeding along a street 202, while a vehicle 204 proceeds along another street 206 toward the friendlies. However, the friendlies 102 may not currently have a clear line of sight to the vehicle 204 (e.g., due to the current orientation 208 of the friendlies and/or the presence of structures concealing the vehicle from view. Further, if the vehicle 204 is not affiliated with the friendlies 102, its existence may not even be known. If, for example, the vehicle 204 is hostile and/or presents a threat, it is in the best interest of the friendlies 102 and of their current mission plan (108, FIG. 1) to be aware of the vehicle's position, intent, and/or capabilities.

In embodiments, the uncrewed vehicles 210, 212 may be positioned throughout the mission environment 100 and may include mobile sensors 120. For example, the uncrewed vehicle 210 may be an aerial vehicle positioned so as to detect the friendlies 102 in the street 202, as well as landmarks 214, 216 (in addition to other landmarks and/or structures throughout the mission environment 100). Similarly, the uncrewed vehicle 212 may be an aerial vehicle positioned so as to detect the vehicle 204 in the street 206, along with landmarks 214, 218, 220. Further, each uncrewed vehicle 210, 212 may know and report its own position (e.g., an absolute position determined via onboard satellite-based or other absolute positioning receiver), and in some embodiments may therefore know the position of any other uncrewed vehicles operating within the mission environment.

In embodiments, the uncrewed vehicles 210, 212 may report to the overwatch system (110, FIG. 1) environmental data (128, FIG. 1) including any objects of interest detected via sensing within the mission environment 100, e.g., the friendlies 102, the vehicle 204, the landmarks 214, 216, 218, 220, along with any image data and/or position data sensed with respect to the objects of interest. For example, sensed environmental data 128 may be timestamped for correlation with concurrent reported positions (126, FIG. 1) of the friendlies 102 and/or the uncrewed vehicles 210, 212.

Figure 3:
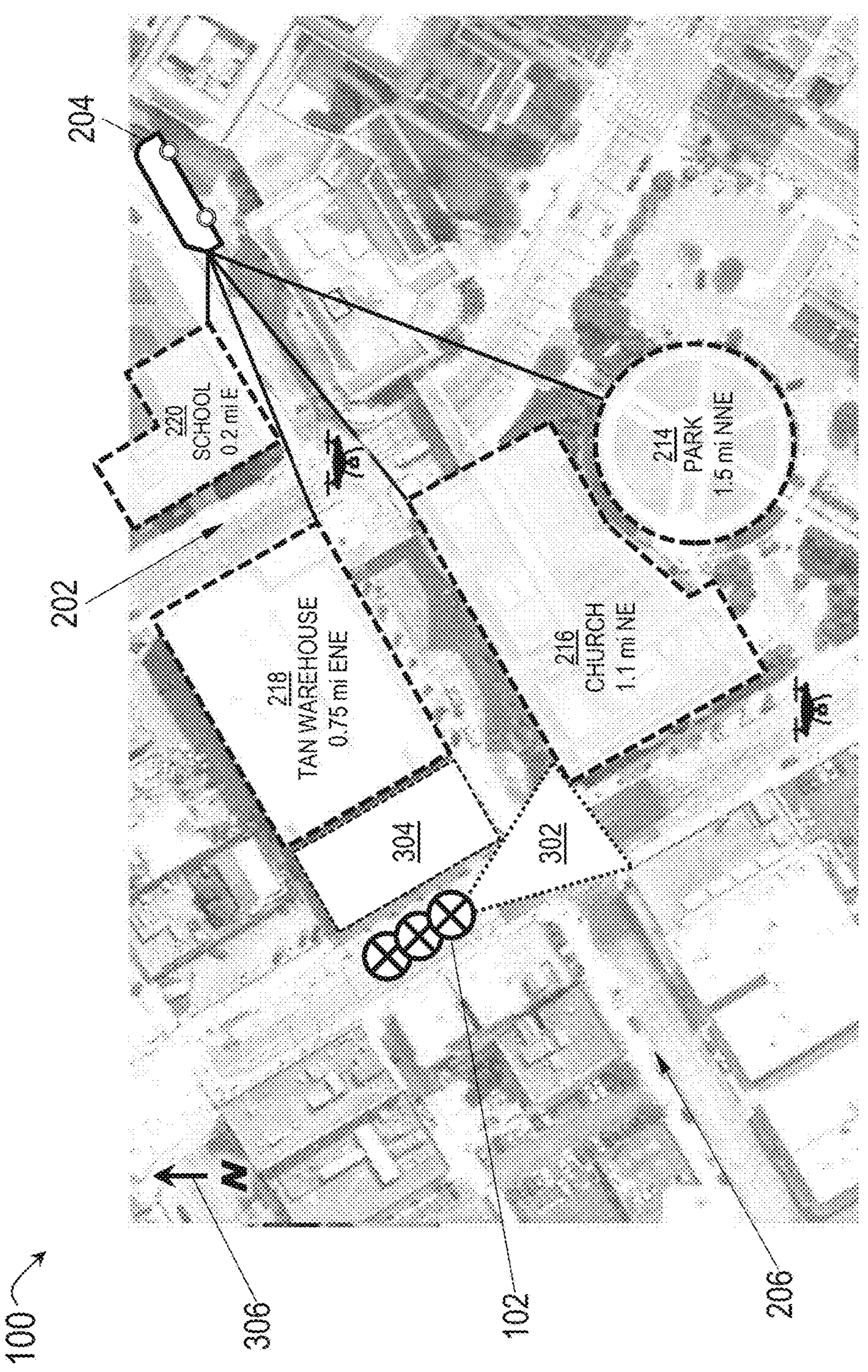
FIGS. 3 and 4 are diagrammatic overhead views of the mission environment of FIG. 1 further illustrating relative positioning operations and intent determination operations of the mission overwatch system of FIG. 1.

Referring now to FIG. 3, in embodiments the overwatch system (110, FIG. 1) may correlate environmental data (128, FIG. 1) sensed by the mobile sensors 120 aboard the uncrewed vehicles (210,212; FIG. 2) with real-time position data (126, FIG. 1) provided by the friendlies 102 and with additional information about the mission environment 100 and the mission itself (e.g., goals, objectives, possible adversaries) as provided by the mission plan (108, FIG. 1) in order to draw informative conclusions therefrom and generate descriptive reports (130, FIG. 1) to provide situational awareness for the friendlies in real time or near real time.

In embodiments, the overwatch system 110 may first attempt to detect objects of interest within the sensed environmental data 128. For example, environmental data 128 may clearly detect the vehicle 204 in the street 206. In embodiments, the overwatch system 110 may confirm that the vehicle 204 is in fact a vehicle (e.g., a ground-based vehicle, a troop carrier) and not some other type of object (e.g., a person or group or persons, a weather system or other natural phenomenon, a fixture of the mission environment 100). For example, the mission plan 108 may indicate that the mission environment 100 is an urban area (and therefore that the vehicle 204 and other vehicles of its type may be found on its streets 202, 206. Further, the mission plan 108 may indicate that vehicles similar to the vehicle 204 have recently been detected within the mission environment 100, or that the vehicle 204 itself has previously been detected, and its prior movement tracked by the overwatch system 110. (For example, based on one or more prior detections of the vehicle 204 by the mobile sensors 120, the overwatch system 110 may infer movement of the vehicle 204 and accordingly its intent (e.g., motion toward the friendlies 102 or toward areas of the mission environment where the friendlies are known to be operating). In embodiments, based on a series or sequence of detections of the vehicle 204, the overwatch system 110 may characterize its movement as a vector comprising a direction (e.g., roughly west-southwest) and a speed (e.g., moderate).

In embodiments, the overwatch system 110 may refer to the mission plan 108 in order to characterize a location or position of any objects of interest (e.g., the vehicle 204) detected within the mission environment 100 relative to one or more landmarks 214, 216, 218, 220 known to the mission plan, such that the landmarks are proximate to the real-time position (126, FIG. 1) of the friendlies 102, visible to and identifiable by the friendlies, or both. The overwatch system 110 may likewise characterize an orientation (e.g., a "pose" including both position and orientation) and/or vector of the friendlies 102 (e.g., based on a series or sequence of reported positions 126 by, and/or detections by the mobile sensors 120 of, the friendlies, if it is known or determined that the friendlies are moving), including the direction in which the friendlies are currently facing and the direction (and/or speed) at which the friendlies are moving, to determine a current field of view 302 (FOV) of the friendlies. For example, the friendlies 102 may currently face roughly south-southeast (and may be traveling in substantially the same direction along the street 202), such that the FOV 302 may provide a relatively clear view of the street 202. However, the structure 304 directly east (e.g., to the left) of the friendlies 102 may partially obstruct their view of the street 206 (and therefore of the vehicle 204).

In embodiments, the overwatch system 110 may refer to the mission plan 108 to identify the landmarks 214, 216, 218, 220 as, respectively, a park 214, a church 216, a tan warehouse 218 (e.g., assuming multiple warehouses within the mission environment 100, this particular warehouse may be more precisely and intuitively identified for the friendlies 102), and a school 220. Further, the friendlies 102 may be briefed on the landmarks 214, 216, 218, 220 as well as other landmarks and/or features within the mission environment 100.

Further, the overwatch system 110 may attempt to determine a relative position of the vehicle 204 relative to each landmark. For example, each of the park 214, the church 216, the tan warehouse 218, and the school 220 may have a location known to the mission plan 108. In embodiments, given the reported position of the sensing uncrewed vehicle 212 in (e.g., above) the street 206 and proximate to the vehicle 204 as well as the school 220, the overwatch system 110 may determine (e.g., via optical vision processing) relative distances between the uncrewed vehicle, the vehicle 204, and the school. Similarly, the mission plan 108 may include accurate maps of the mission environment 100 that correctly indicates directions (e.g., north 306, the southwest/northeast orientation of the street 206, and the north-north-east/south-southwest orientation of the street 202). In embodiments, the overwatch system 110 may therefore determine relative distances and directions of the vehicle 204: e.g., ~0.2 miles east of the school 220; ~0.75 miles east-northeast of the tan warehouse 218, ~1.1 miles north-east of the church 216, ~1.5 miles north-northeast of the park 214.

Figure 4:
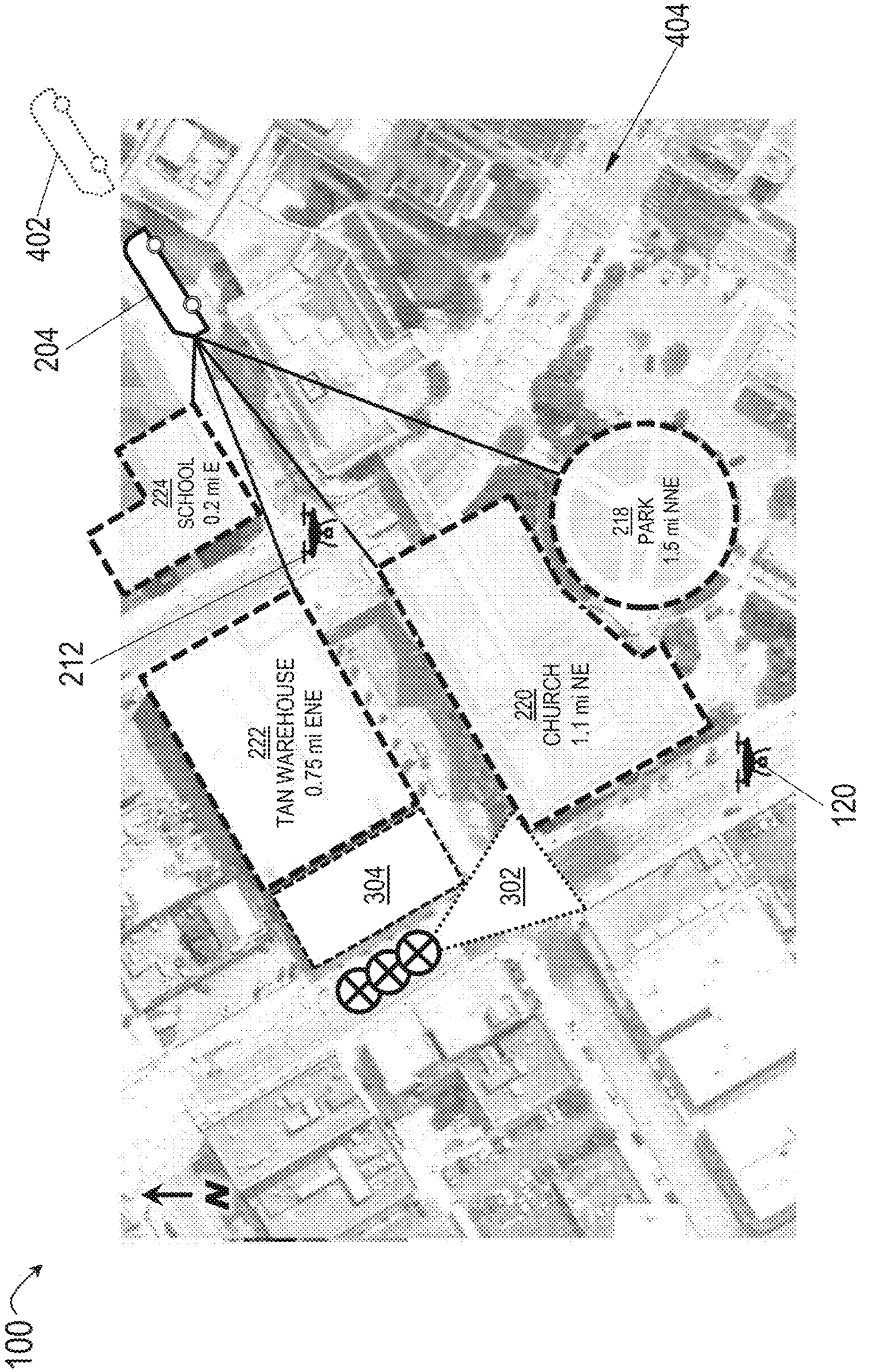

Referring now to FIG. 4, the mission environment 100 is shown.

In embodiments, the overwatch system (110, FIG. 1) may infer an intent (along with other attributes, as discussed above) of a detected object of interest (e.g., the vehicle 204) based on the inferred position data of the object of interest (e.g., the relative position and/or vector of the vehicle 204) and/or the mission plan (108, FIG. 1). For example, the mission plan 108 may positively identify the vehicle 204, or vehicles of its type, as affiliated with known hostiles. Further, the environmental data 128 may provide additional insight into the intent of, and/or threats posed by, the vehicle 204. In embodiments, environmental data 128 (e.g., imaging data collected by the mobile sensors 120 aboard uncrewed vehicle 212) may indicate one or multiple occupants of the vehicle 204 or visible weapons and/or ordnance. For example, a single occupant may be seen by the overwatch system 110 as less of a threat to the friendlies 102 (even if the vehicle 204 is known or determined to be affiliated with hostiles or adversaries), while multiple occupants may be assigned a higher overall threat level.

In embodiments, the vector of the vehicle 204 (when the vehicle is determined to be in motion) may further inform a threat level assigned by the overwatch system 110. For example, based on one or more prior positions 402 of the vehicle 204 over time, the vehicle may be determined to be traveling at a high speed toward the friendlies 102, or toward a position where the friendlies are expected to be and where future contact will be made (e.g., from an angle where the vehicle may be concealed from the friendlies). Higher speeds, and/or directional vectors implying a future contact, associated with the vehicle 204 may result in the overwatch system 110 assigning a higher threat level. Similarly, lower speeds or motion away from the friendlies 102 may be indicative of a lower threat level.

Figure 5:
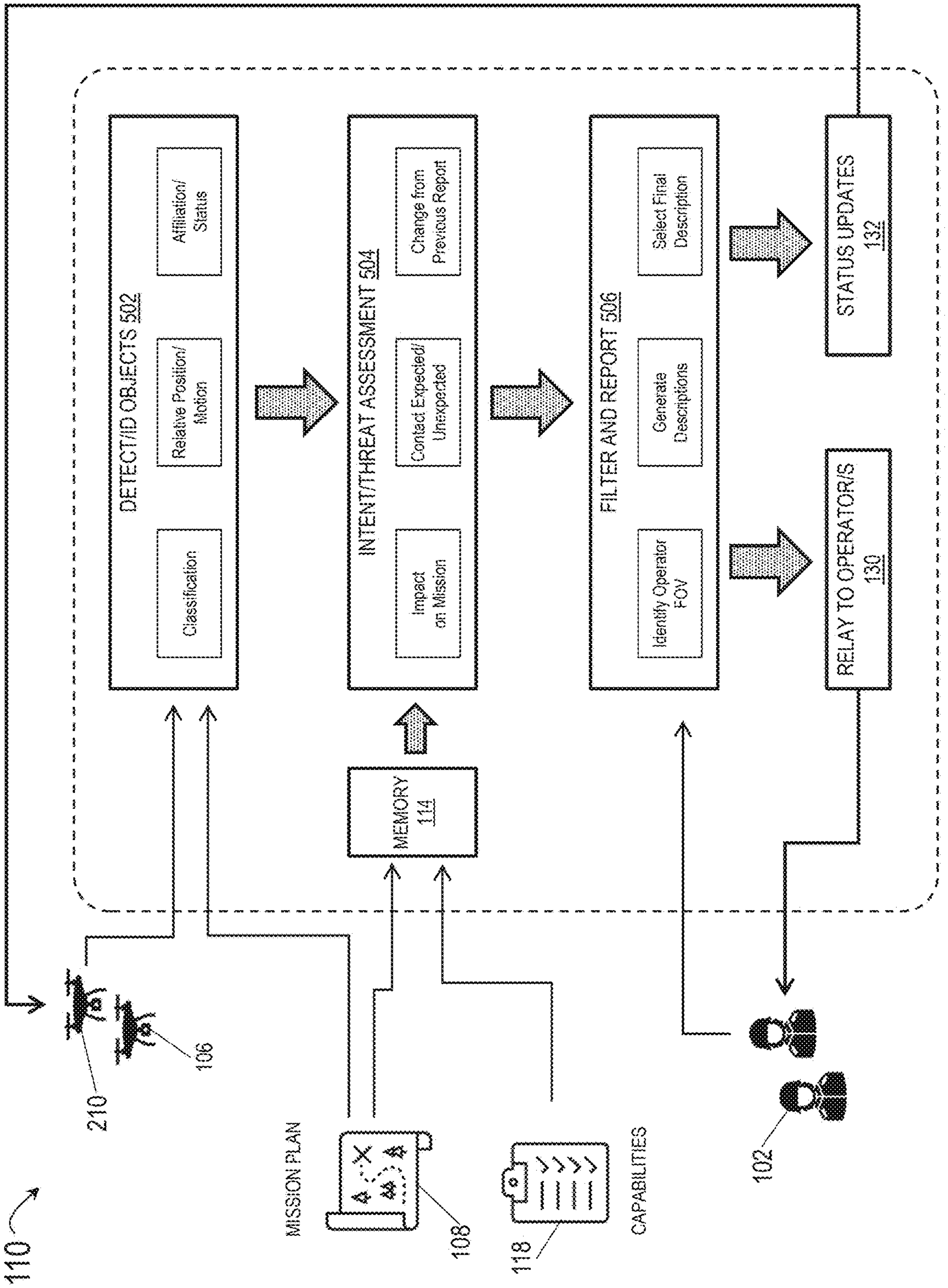
FIG. 5 is a diagrammatic illustration of object detection, object assessment, and descriptive report generation operations within the mission overwatch system of FIG. 1.

Referring now to FIG. 5, the overwatch system 110 is shown.

In embodiments, and as discussed above, the overwatch system 110 may first attempt to detect and identify (502) objects of interest (e.g., the vehicle 204, FIGS. 2-4) within the mission environment (100, FIG. 1), and determine a position of any such objects of interest relative to landmarks (124, FIG. 1) of fixed location known to the mission plan 108 and to the friendlies 102 operating within the mission environment 100 according to the mission plan. For example, having determined positions of objects of interest (e.g., the vehicle 204, FIGS. 2-4) relative to known landmarks (park 214, church 216, tan warehouse 218, school 220: FIGS. 2-4), as well as attributes of the objects of interest (e.g., friendly/hostile/neutral/unknown affiliation of the vehicle, movement of the vehicle), determine reportable descriptive information in order to provide accurate, timely, intuitive, and non-distracting situational awareness of the vehicle to the friendlies who may not currently see the vehicle or know the vehicle's position or intent.

Further, the overwatch system 110 may attempt to assess (504) the intent of, and/or any threat presented by, any such objects of interest to the friendlies, based on, e.g., any information about the objects of interest provided by the mission plan 108 and/or observed behavior of the objects of interest. For example, based on environmental data 128 sensed by the mission sensors 106 (e.g., mobile sensors (120, FIG. 1) aboard uncrewed vehicles (210, 212; FIG. 2); cameras (122, FIG. 1) or other fixed-location sensors), the overwatch system 110 may assess intent and/or threat levels for any detected objects of interest. For example, the identified vehicle 204 may be known to the mission plan 108; its direction and speed may be inferred based on prior positions (402, FIG. 2); intent and/or threat may be inferred based on visual indications derived from the sensed environmental data 128.

In embodiments, the overwatch system 110 may finally determine (506) how to optimally inform the friendlies 102 of any new or updated information collected via the most recent sensing of the mission environment 100. For example, the overwatch system 110 may determine the current FOV (302, FIG. 3) of the friendlies 102, in order to more accurately assess, e.g., what the friendlies can currently see and when contact with any objects of interest may occur, if at all.

In embodiments, the overwatch system 110 may generate one or more descriptive reports 130 to convey new or updated information based on the most recent sensing. For example, referring back to FIG. 4, the most recent sensing (as discussed above) may detect the vehicle 204 at a location within the mission environment 100, proceeding along the street (206, FIG. 2) in a southwesterly direction toward the friendlies 102, whose view of the vehicle (according to their FOV 302) is currently obstructed by the structure 304.

In embodiments, descriptive reports 130 may be generated by the overwatch system 110 using natural language processing to convey useful information about the vehicle 204 in an efficient and intuitive fashion. For example, the vehicle 204 may have an absolute position known to the overwatch system 110, but transmitting the exact coordinates to the friendlies 102 may be of little use or may distract the friendlies from their current task/s at hand (e.g., if the friendlies must refer to a map or display in order to make use of the coordinates).

Figure 6:
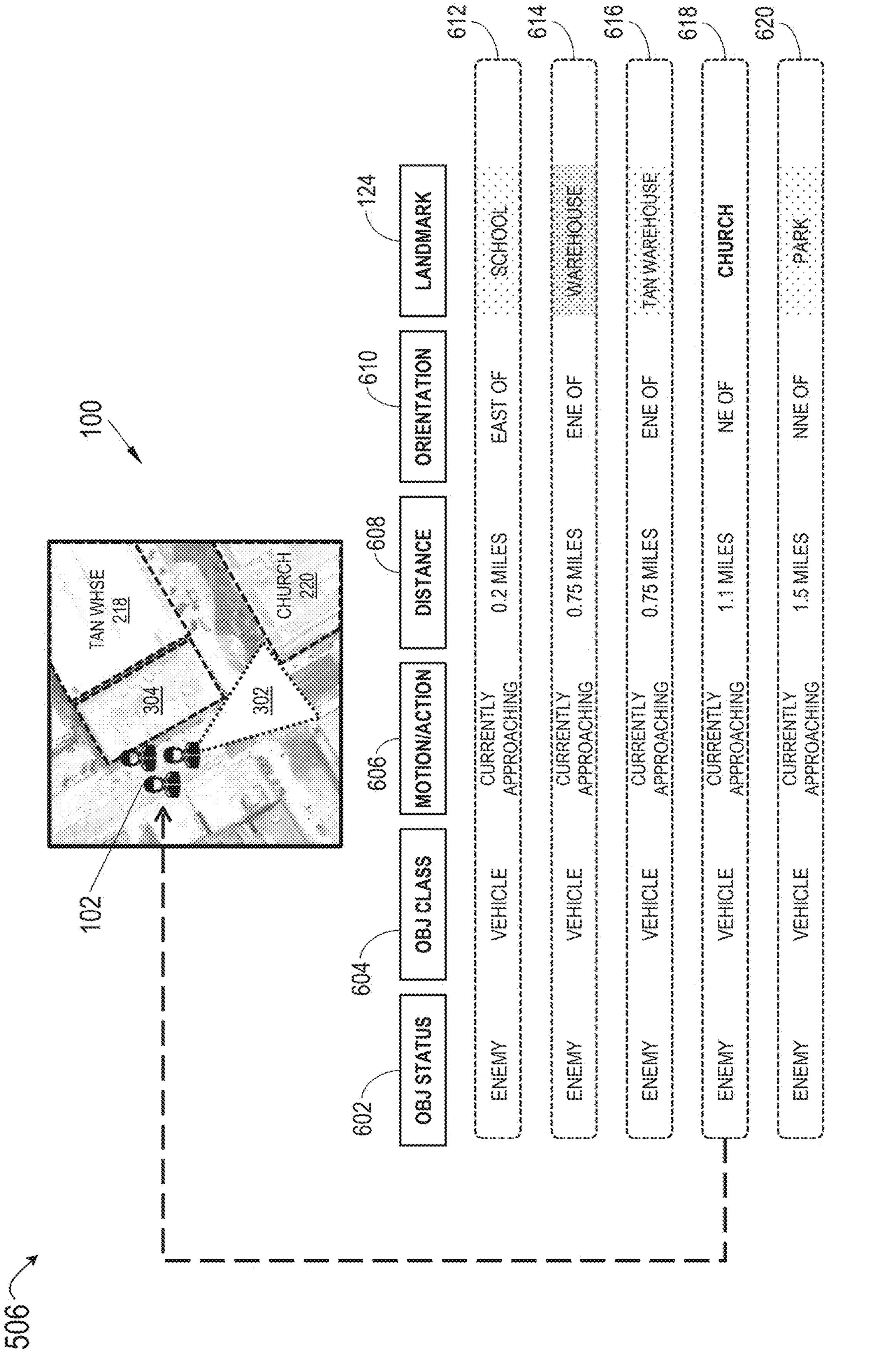
FIG. 6 is a diagrammatic illustration of descriptive report selection operations within the mission overwatch system of FIG. 1.

Referring also to FIG. 6, filtering and reporting operations 506 of the overwatch system 110 are shown.

In embodiments, more than one descriptive report 130 may be generated by the overwatch system (110, FIG. 5), with a final descriptive report selected for forwarding to the friendlies 102 based on brevity, clarity, and the current FOV 302 of the friendlies. For example, based on the current positions of friendlies 102 and environmental data 128 collected within the mission environment 100 by the mission sensors (106, FIG. 1) natural language processing by the overwatch system 110 (e.g., mission processors 112, FIG. 1) may generate a textual format for the descriptive report 130 wherein each descriptive report comprises:

a status 602 of a detected object of interest (e.g., the vehicle 204, FIG. 2; status may include, but is not limited to: friendly, hostile, ally, enemy, neutral, unknown);

a classification 604 of the detected object of interest (e.g., vehicle, person, group of persons, structure);

a current motion and/or action 606 of the detected object of interest (e.g., movement toward the friendlies 102, movement away from the friendlies, other actions taken, intent (e.g., weapons visible));

a relative distance 608 of the detected object of interest;

a relative orientation 610 of the detected object of interest;

and a landmark 124 to which the distance 608 and orientation 610 are relative, the landmark having a fixed location within the mission environment 100 known to the overwatch system 110 (and potentially known to the friendlies 102 as well).

In this way, the descriptive report/s 130 may provide the friendlies 102 with any new or updated information about a detected object of interest: the type of object (e.g., the vehicle 204), its affiliation (e.g., enemy/hostile), its movement (e.g., toward the friendlies), and its current position (distance from, direction from) relative to a landmark known or easily identifiable to the friendlies without including superfluous or counterintuitive information (e.g., exact coordinates of the vehicle or of the friendlies, the name of the street 206 along which the vehicle is moving, the next cross street 404 encountered by the vehicle on its current heading, the positions of the uncrewed vehicles 210, 212).

However, information derived from the environmental data 128 may be conveyed to the friendlies 102 in a number of ways, not all of which may be equally valuable. For example, as discussed above and as shown by FIG. 4, the overwatch system 110 may have determined a position of the vehicle 204 relative to four different landmarks: the park 214, the church 216, the tan warehouse 218, the school 220. Accordingly, a descriptive report 130 generated by the overwatch system 110 according to the format provided above may include (but is not limited to) any of the following forms:

1. the report 612: "ENEMY VEHICLE APPROACHING, CURRENTLY 0.2 MILES EAST OF SCHOOL";
2. the report 614: "ENEMY VEHICLE APPROACHING, CURRENTLY 0.75 MILES EAST-NORTHEAST OF WAREHOUSE";
3. the report 616: "ENEMY VEHICLE APPROACHING, CURRENTLY 0.75 MILES EAST-NORTHEAST OF TAN WAREHOUSE";

4. the report 618: "ENEMY VEHICLE APPROACHING, CURRENTLY 1.1 MILES NORTHEAST OF CHURCH";
5, and the report 620: "ENEMY VEHICLE APPROACHING, CURRENTLY 1.5 MILES NORTH-NORTHEAST OF PARK".

Each of the reports 612-620 may convey that the vehicle 204 is approaching the friendlies 102, and that the vehicle is hostile ("enemy vehicle") and presents a potential threat. Similarly, each of the reports 130 may convey a location of the vehicle 204 relative to a landmark 214, 216, 218, 220 within the mission environment 100. Similarly, each of the reports 612-620 is optimally brief, including no more information than is necessary.

In embodiments, the overwatch system 110, provided a pool or set of reports 612-620 based on a current set of environmental data 128, may select from the set of descriptive reports a final report that is not only optimally brief and optimally clear, but optimally informative in that the final report should include the information most relevant and/or useful to the friendlies 102 based on a variety of factors. For example, the report 612 indicates that the vehicle 204 is 0.75 miles east of a warehouse, but does not specify whether the vehicle is 0.75 miles east of the tan warehouse 218 or 0.75 miles east of some other warehouse, which the friendlies 102 may interpret as ambiguous if other warehouses (or structures that appear to be warehouses) are visible or present. Similarly, if the mission environment 100 is dark (e.g., and/or the friendlies 102 are dependent on night-vision goggles, thermal imagers, or similar devices operating outside the visible light spectrum), such structures may not be clearly identifiable by the friendlies as a tan warehouse. Accordingly, while the report 612 may be preferred to the report 614 based on brevity, the report 614 provides greater clarity, solving the above ambiguity by specifying the tan warehouse 218 as the relative landmark 124.

However, according to the current FOV 302 of the friendlies 102 as determined by the overwatch system 110, the tan warehouse 218 is obstructed from the friendlies' FOV by the structure 304 and therefore not currently visible to the friendlies. Similarly, as shown by FIG. 4 above, neither the park 214 nor the school 220 are within the current FOV 302 of the friendlies 102 (e.g., the park 214 is obscured by the church 216, the school 220 is obscured by the structure 304 and the tan warehouse 218). Accordingly, each of the reports 612, 614, 616, and 620 may provide the friendlies 102 with a position of the vehicle 204 relative to a landmark not currently visible to the friendlies.

In embodiments, the overwatch system 110 may therefore conclude that the report 618 is optimally informative, in that only the report 618 provides a position of the vehicle 204 relative to a landmark within the current FOV 302 of the friendlies 102 and therefore clearly visible, i.e., the church 216. Accordingly, the overwatch system 110 may select the report 618, which provides the best combination of brevity, clarity, and relevance, as the final report for forwarding (130) to the friendlies 102.

Figure 7:
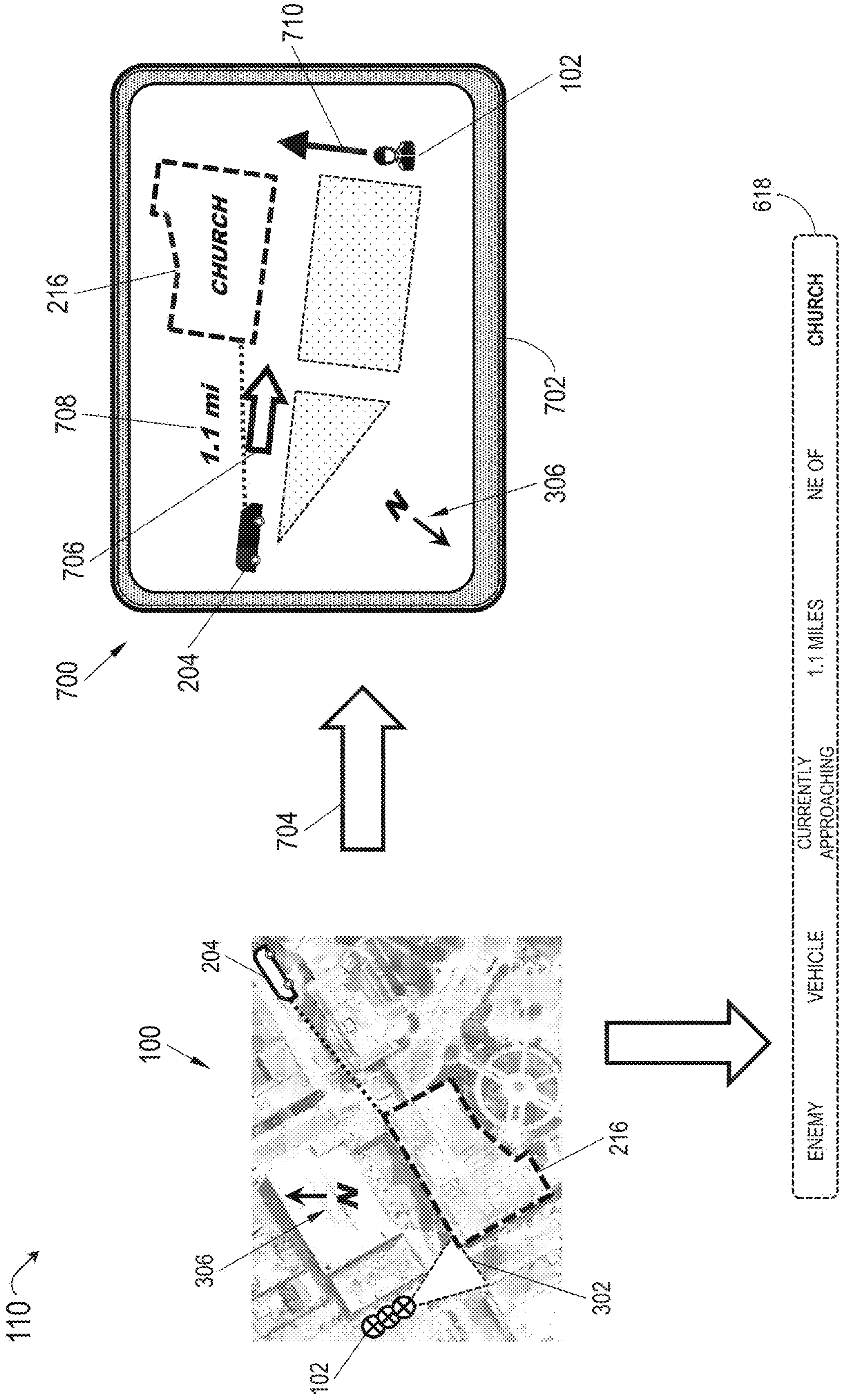
FIG. 7 is a diagrammatic illustration of graphical report generation operations within the mission overwatch system of FIG. 1.

In some embodiments, referring also to FIG. 7, the descriptive report 130 and/or the selected final report 618 may be converted by the overwatch system 110 into a graphical report 700 forwarded to the friendlies 102. For example, one or more of the friendlies 102 may be known to carry a mobile device 702 capable of displaying graphical map-based information. Mobile devices 702 may include tablets, smartphones, phablets, or any other appropriate device connected or connectible to the overwatch system 110 via wireless link (e.g., secure wireless link).

In embodiments, the overwatch system 110 may convert the information conveyed by descriptive report 130 and/or the selected final report 618 from textual to a graphical format that provides all the information conveyed by the descriptive report or final report and is optimized by the overwatch system to provide minimal distraction or loss of cognitive focus to the friendlies 102. For example, the graphical report 700 generated by the overwatch system 110 and transmitted (704) to the mobile device 702 carried by the friendlies 102 may be rendered graphically (e.g., via simple, high contrast graphics) so as to convey at a glance the vehicle 204 approaching (706) the friendlies, the distance (708) between the vehicle and the church 216, and the position of the vehicle and the church relative to the current position and forward motion (710) of the friendlies.

In embodiments, the graphical elements of the graphical report 700 may be utilized to convey additional information if such information is available, useful, and determined by the overwatch system 110 to be non-distracting. For example, the arrow indicating the approaching motion 706 of the vehicle 204 may be lengthened or shortened to convey faster or slower approach speed of the vehicle. Similarly, the graphic representation of the vehicle 204 may be colored or shaded to indicate its status as enemy or hostile. Further, the graphical report 700 may reorient its rendering of the mission environment 100 to align with the direction of motion (710) or FOV 302 of the friendlies (e.g., rather than defaulting to north 306).

In some embodiments, referring back to FIG. 4, the overwatch system 110 may further update (132) one or more of the uncrewed vehicles 210, 212 as to the position and intent of the vehicle 204. Alternatively or additionally, the overwatch system 110 may forward a status update 132 to the uncrewed vehicle 212 which initially detected the vehicle 204, instructing it to follow the vehicle and/or maintain visual contact.

Figure 8A:
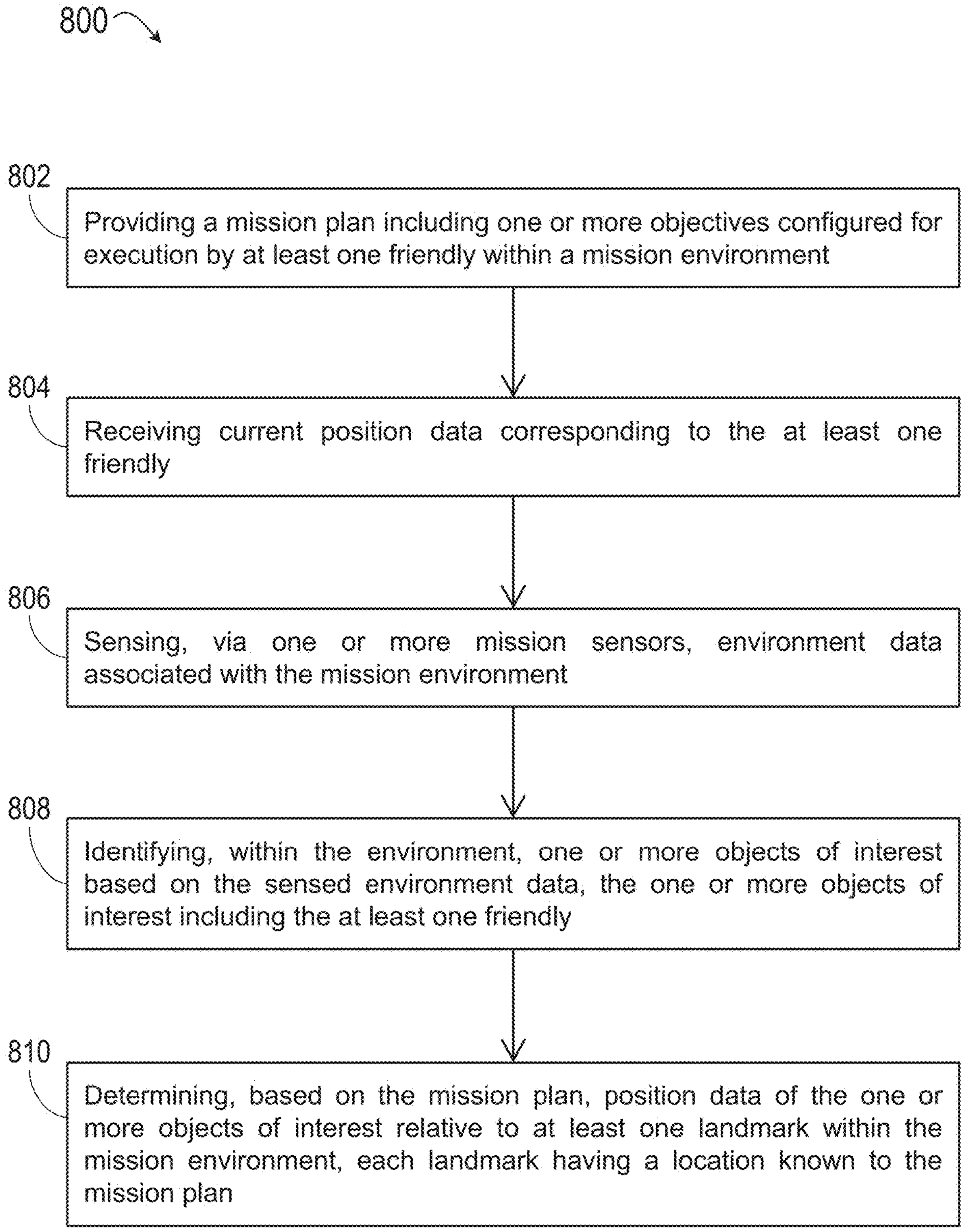
FIGS. 8A through 8C are process flow diagrams illustrating a computer-assisted method for real time mission overwatch according to example embodiments of this disclosure.

Referring now to FIG. 8A, the method 800 may be implemented by the overwatch system 110 and may include the following steps.

At a step 802, a mission plan is provided (e.g., and stored by the overwatch system) incorporating mission goals or objectives fulfillable by one or more friendlies (e.g., ground-based troops or personnel) operating in a mission environment. In some embodiments, the mission plan includes capabilities of friendly and hostile forces (e.g., personnel, equipment, vehicles).

At a step 804, the overwatch system receives current position data from the friendlies (e.g., absolute satellite-based positions, relative positions based on a last known absolute position).

At a step 806, mission sensors collect environmental data throughout the mission environment. In some embodiments, mission sensors include cameras or other sensors having a fixed location (e.g., attached to fixtures within the mission environment). In some embodiments, mission sensors are mobile, e.g., mounted to crewed or uncrewed vehicles (e.g., aircraft, ground-based, water-based) which also report their positions to the overwatch system.

At a step 808, the overwatch system identifies or detects objects of interest within the mission environment, which may include the friendlies. In some embodiments, objects of interest include persons, groups of persons, vehicles, and/or obstacles.

At a step 810, the overwatch system determines position data of any detected or identified objects of interest relative to landmarks at fixed locations known to the mission plan (and possibly to the friendlies). In some embodiments, landmarks include manmade or natural structures or features within the mission environment.

Figure 8B:
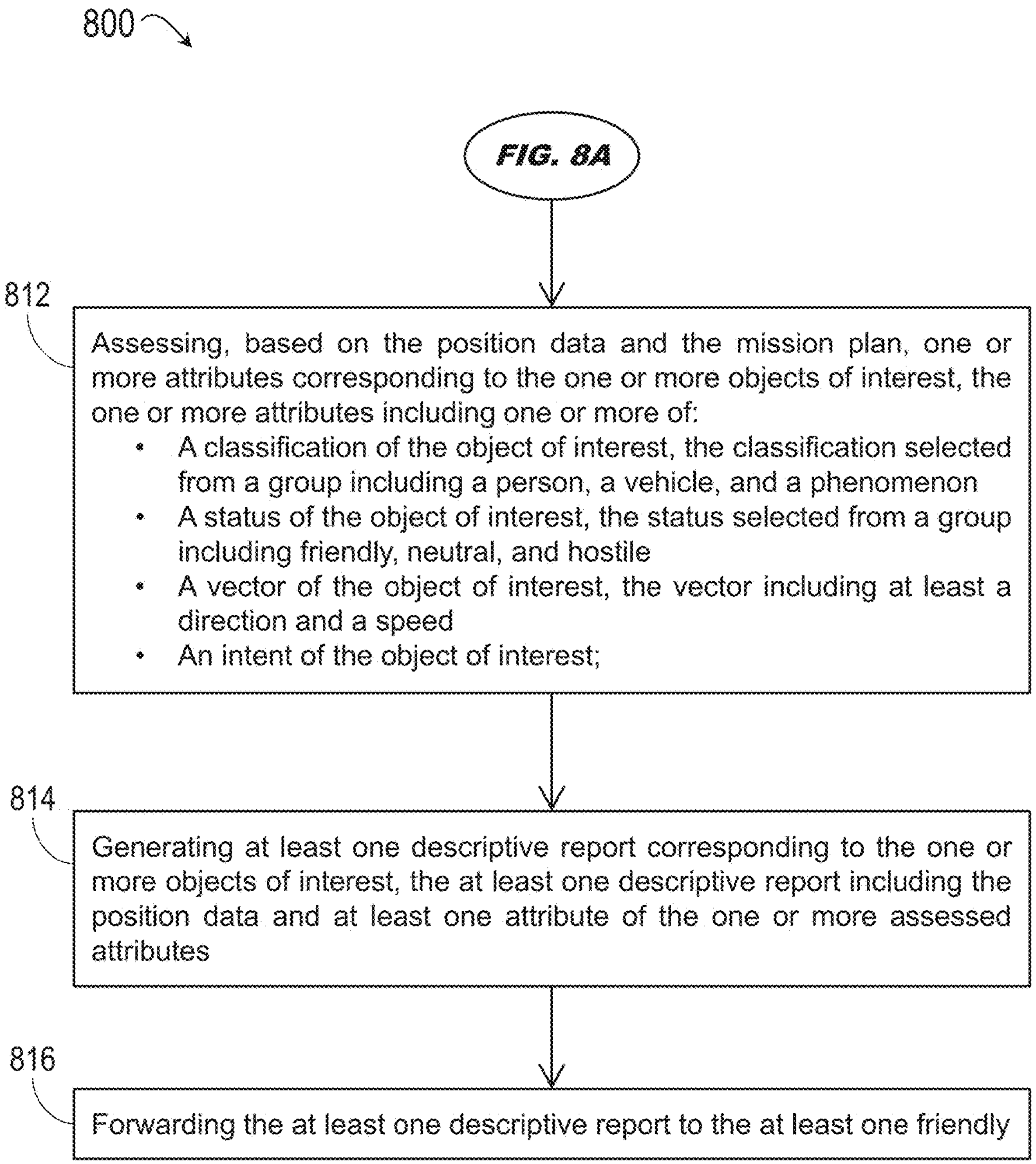

Referring also to FIG. 8B, at a step 812, the overwatch system assesses attributes of the identified or detected objects of interest based on the sensed environmental data and position data associated with the objects. In some embodiments, attributes include a classification of the object (e.g., whether the object is a person or group thereof; whether the object is a vehicle (and if so, what type/s); whether the object is a weather system or other natural phenomenon. In some embodiments, attributes include an affiliation of the object (e.g., friendly, hostile, neutral, unknown). In some embodiments, attributes include a vector of the object, e.g., if the object is moving (based on comparison of current and prior detections of the object), and if so at what direction and velocity. In some embodiments, attributes include an intent of the object (e.g., possible objectives, whether the object presents a threat and if so, how great a threat).

At a step 814, the overwatch system generates descriptive reports based on any new or updated information collected by the most recent sensing of the mission environment. For example, a descriptive report may reference a detected object, its affiliation and status, its direction and speed of motion relative to a known landmark, and/or its intent/threat level. In some embodiments, multiple candidate reports are generated and the overwatch system selects an optimal final report therefrom. The selection of the final report from the set of candidate reports may be based on a variety of factors, e.g., clarity, brevity, and/or the current field of view of the friendlies. For example, the overwatch system may select reports accurately locating an object relative to a landmark the friendlies can currently see over reports accurately locating the object relative to currently non-visible or potentially ambiguous landmarks. In some embodiments, descriptive reports may be textual reports generated via natural language processing. In some embodiments, descriptive reports may be graphical reports designed to instantly convey useful information with a minimum of processing or distractions from cognitive focus. For example, graphical reports may indicate a position of an object of interest, reorienting a display map to align with the friendlies' current direction of motion.

At a step 816, the overwatch system forwards the descriptive report (e.g., the selected final report, if one is selected from multiple candidate reports) to the friendlies.

Figure 8C:
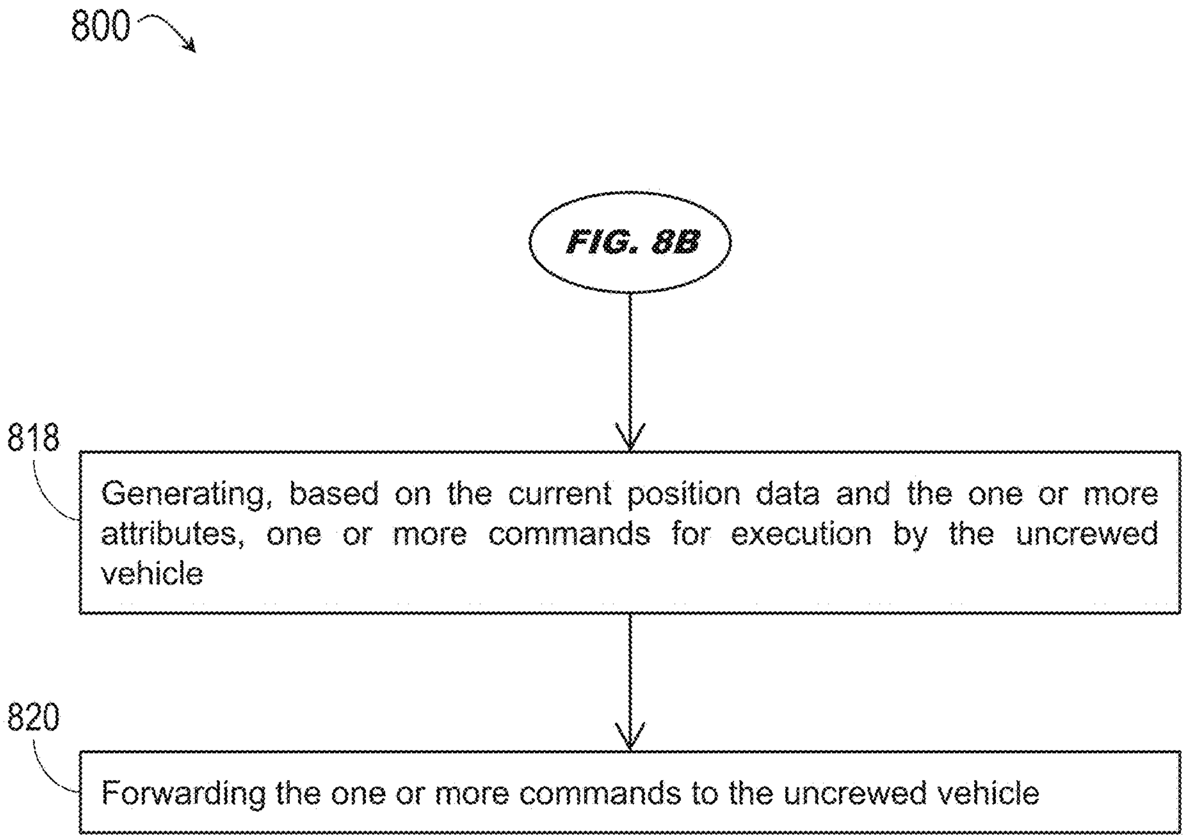

Referring also to FIG. 8C, the method 800 may include method steps 818 and 820. At the step 818, the overwatch system generates status updates for mobile sensing vehicles (e.g., crewed or uncrewed). In some embodiments, status updates include commands or instructions executable by an uncrewed vehicle, e.g., following a detected object of interest or maintaining visual contact.

At the step 820, the overwatch system forwards the status update/s to the uncrewed vehicle/s.

Benefits of the Invention

Embodiments of the inventive steps disclosed herein may provide human/machine teaming implementations that automatically provide situational awareness to troops and personnel on the ground via mobile vehicle-mounted sensors in formats clearly and easily understandable by human recipients and which minimizes distraction or loss of cognitive focus for engaged personnel (e.g., identification of objects of interest not otherwise visible to the human recipients, information about the position, motion, intent, and/or potential threat of said objects of interest). Further, information about objects of interest detected within the mission environment may be utilized to provide instructions for vehicle-mounted sensors (e.g., uncrewed aerial vehicles) to follow, track or evade a particular object of interest. Further still, the ability to identify objects of interest within a mission environment may be utilized to detect spoofing of position data, e.g., by confirming or disproving the presence of vehicles, equipment, or personnel at a reported position.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for mission overwatch within an environment, the system comprising:

a memory configured for storage of:

a mission plan including one or more objectives for execution by one or more friendly ground-based troops within a mission environment, the mission plan including at least one landmark within the mission environment, each landmark having a fixed location known to the mission plan;

and processor-executable encoded instructions;

one or more mission sensors disposed within the mission environment and configured to collect environmental data associated with the mission environment;

and at least one mission processor communicatively coupled to the one or more mission sensors and to the one or more friendly ground-based troops, the at least one mission processor configurable by the processor-executable encoded instructions for:

receiving current position data from the one or more friendly ground-based troops;

receiving the sensed environmental data from the one or more mission sensors;

identifying one or more objects of interest based on the sensed environmental data, the one or more objects of interest including the one or more friendly ground-based troops;

determining, based on the mission plan and the environmental data, position data associated with the one or more objects of interest, the position data relative to the at least one landmark;

assessing, based on the mission plan and the position data, one or more attributes corresponding to the one or more objects of interest, the one or more assessed attributes including one or more of:

a classification of the object of interest, the classification selected from a group including a person, a vehicle, and a phenomenon;

a status of the object of interest, the status selected from a group including friendly, neutral, and hostile;

a vector of the object of interest, the vector including at least a direction and a speed;

or an intent of the object of interest;

generating at least one descriptive report corresponding to the one or more objects of interest, the at least one descriptive report including the position data and at least one attribute of the one or more assessed attributes;

and forwarding the at least one descriptive report to the one or more friendly ground-based troops.

2. The system of claim 1, wherein the at least one descriptive report is a final descriptive report selected by the at least one mission processor from a pool of two or more generated descriptive reports.

3. The system of claim 1, wherein the at least one descriptive report includes one or more of a textual report or a graphical report.

4. The system of claim 1, wherein the current position data includes at least one of an orientation of the one or more friendly ground-based troops or a field of view (FOV) of the one or more friendly ground-based troops.

5. The system of claim 4, wherein the at least one descriptive report is a final descriptive report selected by the at least one mission processor from a pool of two or more generated descriptive reports based on a compatibility of the two or more generated descriptive reports with the FOV of the one or more friendly ground-based troops.

6. The system of claim 1, wherein the one or more mission sensors include at least one mission sensor attached to an uncrewed vehicle.

7. The system of claim 6, wherein the at least one mission processor is further configured for:

generating, based on the current position data and the one or more attributes, one or more commands for execution by the uncrewed vehicle;

and forwarding the one or more commands to the uncrewed vehicle.

8. The system of claim 1, wherein the one or more mission sensors include at least one mission sensor attached to a crewed vehicle.

9. The system of claim 1, wherein the one or more mission sensors include at least one mission sensor attached to at least one of an aerial vehicle or a ground-based vehicle.

10. The system of claim 1, wherein the intent of an object of interest includes a threat level of the object of interest.

11. The system of claim 1, wherein the at least one mission processor is configured to determine the intent of an object of interest based on a change in the one or more attributes corresponding to the object of interest.

12. A computer-assisted method for providing overwatch in an environment, the method comprising:

providing a mission plan including one or more objectives configured for execution by one or more friendly ground-based troops within a mission environment;

receiving current position data corresponding to the one or more friendly ground-based troops;

sensing, via one or more mission sensors, environmental data associated with the mission environment;

identifying, within the environment, one or more objects of interest based on the sensed environmental data, the one or more objects of interest including the one or more friendly ground-based troops;

determining, based on the mission plan, position data of the one or more objects of interest relative to at least one landmark within the mission environment, each landmark having a location known to the mission plan;

assessing, based on the position data and the mission plan, one or more attributes corresponding to the one or more objects of interest, the one or more attributes including one or more of:

a classification of the object of interest, the classification selected from a group including a person, a vehicle, and a phenomenon;

a status of the object of interest, the status selected from a group including friendly, neutral, and hostile;

a vector of the object of interest, the vector including at least a direction and a speed;

or an intent of the object of interest;

generating at least one descriptive report corresponding to the one or more objects of interest, the at least one descriptive report including the position data and at least one attribute of the one or more assessed attributes;

and forwarding the at least one descriptive report to the one or more friendly ground-based troops.

13. The computer-assisted method of claim 12, wherein forwarding the at least one descriptive report to the one or more friendly ground-based troops includes:

selecting, from two or more generated descriptive reports, a final descriptive report;

and forwarding the selected final report to the at least one or more friendly ground-based troops.

14. The computer-assisted method of claim 12, wherein generating at least one descriptive report corresponding to the one or more objects of interest includes:

generating at least one of a textual report or a graphical report corresponding to the one or more objects of interest.

15. The computer-assisted method of claim 12, wherein receiving current position data corresponding to the one or more friendly ground-based troops includes:

receiving at least one of an orientation of the one or more friendly ground-based troops or a field of view (FOV) of the one or more friendly ground-based troops.

16. The computer-assisted method of claim 15, wherein forwarding the at least one descriptive report to the one or more friendly ground-based troops includes:

selecting, from two or more generated descriptive reports, a final descriptive report based on a compatibility of the two or more generated descriptive reports with the FOV of the one or more friendly ground-based troops;

and forwarding the selected final descriptive report to the one or more friendly ground-based troops.

17. The computer-assisted method of claim 12, wherein sensing, via one or more mission sensors, environmental data associated with the mission environment includes:

sensing, via one or more mission sensors associated with an uncrewed vehicle, the environmental data.

18. The computer-assisted method of claim 17, further comprising:

generating, based on the current position data and the one or more attributes, one or more commands for execution by the uncrewed vehicle;

and forwarding the one or more commands to the uncrewed vehicle.

19. The computer-assisted method of claim 12, wherein assessing, based on the position data and the mission plan, one or more attributes corresponding to the one or more objects of interest includes:

determining a threat level of the one or more objects of interest.

20. The computer-assisted method of claim 12, wherein assessing, based on the position data and the mission plan, one or more attributes corresponding to the one or more objects of interest includes:

determining the intent of an object of interest based on a change in the one or more attributes corresponding to the object of interest.

* * * * *